US012807013B2

(12) United States Patent
Tsukamoto

(10) Patent No.: US 12,807,013 B2
(45) Date of Patent: Nov. 24, 2026

(54) CHARGING SYSTEM WITH AN AUXILIARY BATTERY FOR SUPPLYING POWER TO A CONTROLLER

(71) Applicant: TOYOTA JIDOSHA KABUSHIKI KAISHA, Toyota (JP)

(72) Inventor: Shota Tsukamoto, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 18/379,276

(22) Filed: Oct. 12, 2023

(65) Prior Publication Data

US 2024/0157822 A1 May 16, 2024

(30) Foreign Application Priority Data

Nov. 11, 2022 (JP) ................................. 2022-180812

(51) Int. Cl.

| | |
|---|---|
| ***H01M 10/46*** | (2006.01) |
| ***B60L 53/16*** | (2019.01) |
| ***B60L 53/35*** | (2019.01) |
| ***B60L 58/20*** | (2019.01) |
| ***H02J 7/70*** | (2026.01) |

(52) U.S. Cl.

CPC ............... *B60L 53/16* (2019.02); *B60L 53/35* (2019.02); *B60L 58/20* (2019.02); *H02J 7/70* (2026.01)

(58) Field of Classification Search

CPC .. H02J 7/70; B60L 53/16; B60L 53/14; B60L 53/35; B60L 53/65; B60L 53/50; B60L 53/60

USPC ................ 320/103, 104, 106, 107, 109, 132

See application file for complete search history.

(56) References Cited

U.S. PATENT DOCUMENTS

| | | | | |
|---|---|---|---|---|
| 2010/0019723 | A1 | 1/2010 | Ichikawa | |
| 2018/0354383 | A1* | 12/2018 | Namou | B60L 53/124 |
| 2020/0207233 | A1* | 7/2020 | Sato | B60L 50/64 |
| 2022/0219565 | A1* | 7/2022 | Narematsu | B60L 58/12 |
| 2024/0262244 | A1* | 8/2024 | Iwahori | B60L 58/14 |

FOREIGN PATENT DOCUMENTS

| | | | | |
|---|---|---|---|---|
| DE | 102017123071 | B4 * | 10/2024 | B60L 58/21 |
| JP | 2008-206300 | A | 9/2008 | |
| JP | 2010-124556 | A | 6/2010 | |
| JP | 2015-211548 | A | 11/2015 | |
| JP | 2020-108256 | A | 7/2020 | |
| JP | 2020-191732 | A | 11/2020 | |

* cited by examiner

*Primary Examiner* — Edward Tso
(74) *Attorney, Agent, or Firm* — Oliff PLC

(57) ABSTRACT

A charging system includes: a vehicle including an inlet, a vehicle controller, a battery for traveling of the vehicle, and an auxiliary battery for supplying power to the vehicle controller; and a charging device including a connector configured to be connected to the inlet of the vehicle, a charging controller, and a power source, the auxiliary battery of the vehicle and the power source of the charging device being configured to be electrically connected to each other when the inlet of the vehicle and the connector of the charging device is connected to each other, the charging controller of the charging device being configured to supply power from the power source to the auxiliary battery to charge the auxiliary battery when communication between the vehicle controller and the charging controller is not established.

2 Claims, 2 Drawing Sheets

CHARGING SYSTEM WITH AN AUXILIARY BATTERY FOR SUPPLYING POWER TO A CONTROLLER

The present application claims priority to and incorporates by reference the entire contents of Japanese Patent Application No. 2022-180812 filed in Japan on Nov. 11, 2022.

BACKGROUND

The present disclosure relates to a charging system.

In JP 2015-211548 A1, a technique of suppressing a voltage drop of an auxiliary battery by an on-vehicle charger including a DCDC converter for charging the auxiliary battery is disclosed.

SUMMARY

In an electric vehicle, when power of an auxiliary battery of the electric vehicle is insufficient due to long-term leaving of the electric vehicle or the like, the auxiliary battery cannot supply the power to a vehicle controller of electric vehicle even in a state where a remaining amount of a battery for traveling of the electric vehicle is present, and the vehicle controller is not activated. Therefore, a charging control device provided in a charging device cannot communicate with the vehicle controller and cannot start charging of the battery for traveling of the electric vehicle.

There is a need for a charging system capable of starting charging of a battery for traveling of a vehicle by performing communication between a vehicle controller and a charging control device even if power of an auxiliary battery that supplies power to the vehicle controller is insufficient.

According to one aspect of the present disclosure, there is a charging system comprising: a vehicle including an inlet, a vehicle controller, a battery for traveling of the vehicle, and an auxiliary battery for supplying power to the vehicle controller; and a charging device including a connector configured to be connected to the inlet of the vehicle, a charging controller, and a power source, the charging device being configured to charge the battery for traveling of the vehicle when the connector of the charging device is connected to the inlet of the vehicle and the vehicle controller of the vehicle is communicated with the charging controller of the charging device, the auxiliary battery of the vehicle and the power source of the charging device being configured to be electrically connected to each other when the inlet of the vehicle and the connector of the charging device is connected to each other, the charging controller of the charging device being configured to supply power from the power source to the auxiliary battery to charge the auxiliary battery when communication between the vehicle controller and the charging controller is not established.

The above and other features, advantages and technical and industrial significance of this disclosure will be better understood by reading the following detailed description of presently preferred embodiments of the disclosure, when considered in connection with the accompanying drawings.

DETAILED DESCRIPTION

A first embodiment of a charging system according to the disclosure will be described below. Note that the disclosure is not limited to the present embodiment.

Figure 1:
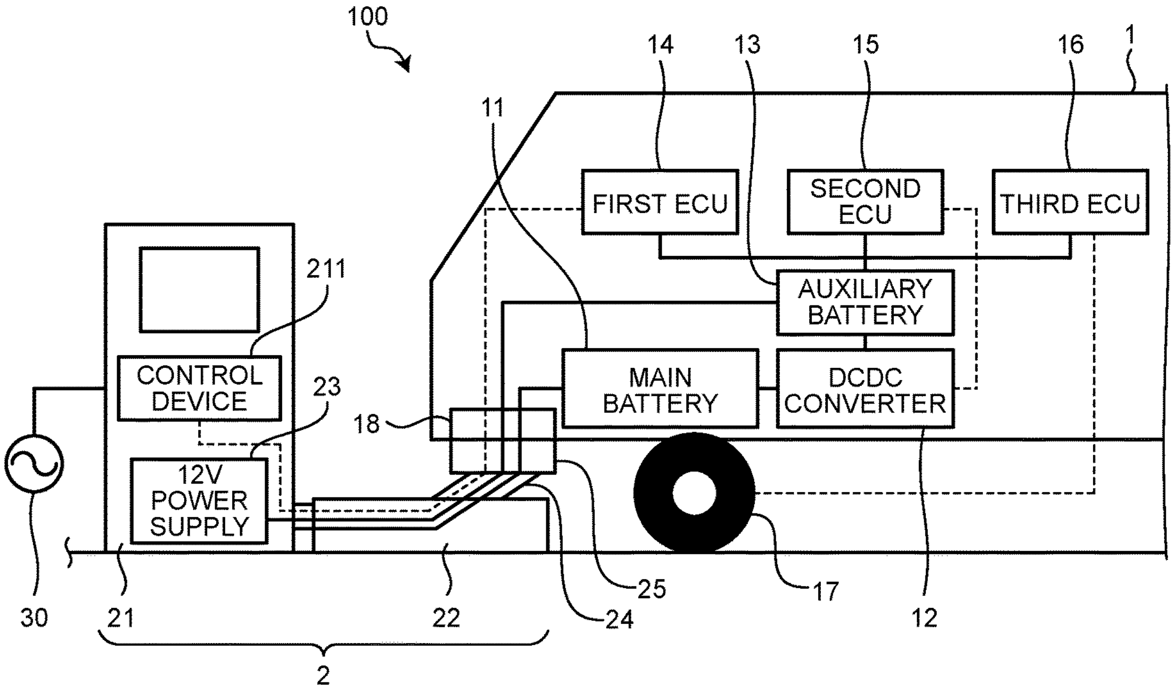
FIG. 1 is a diagram illustrating a schematic configuration of a charging system according to a first embodiment.

FIG. 1 is a diagram illustrating a schematic configuration of a charging system 100 according to a first embodiment. The charging system 100 according to the first embodiment includes a vehicle 1 and an automatic charging device 2.

The vehicle 1 is parked in a parking space provided on a side of the automatic charging device 2. The vehicle 1 is, for example, an electric vehicle including at least a driving motor as a driving power source. The vehicle 1 includes a main battery 11, a DCDC converter 12, an auxiliary battery 13, a first ECU 14, a second ECU 15, a third ECU 16, drive wheels 17, and an inlet 18. The main battery 11 is, for example, a battery for traveling of the vehicle 1, and stores electric power to be supplied to a traveling motor, an inverter, or the like that drives the drive wheels 17 when the vehicle 1 travels. The DCDC converter 12 is capable of transforming electric power from the main battery 11 and supplying the transformed electric power to the auxiliary battery 13. The auxiliary battery 13 stores, for example, electric power to be supplied to the first ECU 14, the second ECU 15, the third ECU 16, and the like. The main battery 11 and the auxiliary battery 13 are configured to be chargeable by a charging facility 21 via the inlet 18.

The automatic charging device 2 includes the charging facility 21 and an arm device 22. The charging facility 21 is an external power supply facility such as a charging station connected to a system power supply 30. The charging facility 21 includes a control device 211 and a 12V power supply 23. The control device 211 is a charging controller capable of performing charge control by receiving a charge start instruction from a user or performing a charge communication with the first ECU 14 of the vehicle 1.

The arm device 22 includes a charging arm 24 including a connector 25. The arm device 22 serves as an arm and automatically performs insertion and removal of the connector 25 with respect to the inlet 18 of the vehicle 1 located in the parking space provided on the side of the automatic charging device 2 by driving the charging arm 24.

In the automatic charging device 2, the control device 211 of the charging facility 21 controls the arm device 22 so that the arm device 22 can automatically insert and remove the connector 25 into and from the inlet 18 of the vehicle 1 and perform automatic charging for charging the main battery 11 of the vehicle 1. The charging facility 21 includes a 12V power supply 23 serving as a power source. The 12V power supply 23 of the charging facility 21 is electrically connected to the auxiliary battery 13 of the vehicle 1 via the arm device 22 while the inlet 18 of the vehicle 1 is connected to the connector 25 of the arm device 22.

In the vehicle 1 according to the first embodiment, the first ECU 14 is a vehicle controller configured to be able to communicate with the control device 211 of the charging facility 21 while the connector 25 is connected to the inlet 18, and is capable of performing charge control of the main battery 11. The second ECU 15 is a vehicle controller configured to be able to communicate with DCDC converter 12, and can control the DCDC converter 12. In addition, the third ECU 16 is a vehicle controller configured to be able to communicate with the traveling motor and the inverter, and can control the traveling motor and the inverter. The first ECU 14, the second ECU 15, and the third ECU 16 are activated by electric power supplied from the auxiliary battery 13, and can perform various kinds of control and the like.

If the power of the auxiliary battery 13 of the vehicle 1 is insufficient and the auxiliary battery 13 cannot supply the power to the first ECU 14, the first ECU 14 cannot be activated. Therefore, the first ECU 14 cannot communicate with the charging facility 21, and the automatic charging by the automatic charging device 2 cannot be started. In addition, if the auxiliary battery 13 cannot supply the power to the second ECU 15 due to a power shortage of the auxiliary battery 13, the second ECU 15 cannot be activated. Therefore, the second ECU 15 cannot control the DCDC converter 12, and the power of the main battery 11 cannot be transformed by DCDC converter 12 and the transformed power cannot be supplied to the auxiliary battery 13, so that the auxiliary battery 13 cannot be charged. In addition, if the auxiliary battery 13 cannot supply the power to the third ECU 16 due to the power shortage of the auxiliary battery 13, the third ECU 16 cannot be activated. Therefore, the third ECU 16 cannot control the driving motor, the inverter, and the like that drive the driving wheels 17, and thus cannot cause the vehicle 1 to travel.

On the other hand, in the charging system 100 according to the first embodiment, when communication between the first ECU 14 of the vehicle 1 and the control device 211 of the charging facility 21 cannot be performed, the 12V power supply 23 of the charging facility 21 supplies electric power to the auxiliary battery 13 to charge the auxiliary battery 13. As a result, the auxiliary battery 13 is charged to a constant voltage, so that the auxiliary battery 13 can supply electric power to the first ECU 14, the second ECU 15, and the third ECU 16. Therefore, the first ECU 14 can be activated to perform communication between the first ECU 14 and the charging facility 21, and the automatic charging by the automatic charging device 2 can be started. In addition, the second ECU 15 is activated, and the second ECU 15 controls the DCDC converter 12 to transform the electric power of the main battery 11 to be supplied to the auxiliary battery 13, and the auxiliary battery 13 can be charged by the transformed electric power supplied. In addition, the third ECU 16 is activated to control the driving motor, the inverter, or the like for driving the driving wheels 17, so that the vehicle 1 can be traveled.

Figure 2:
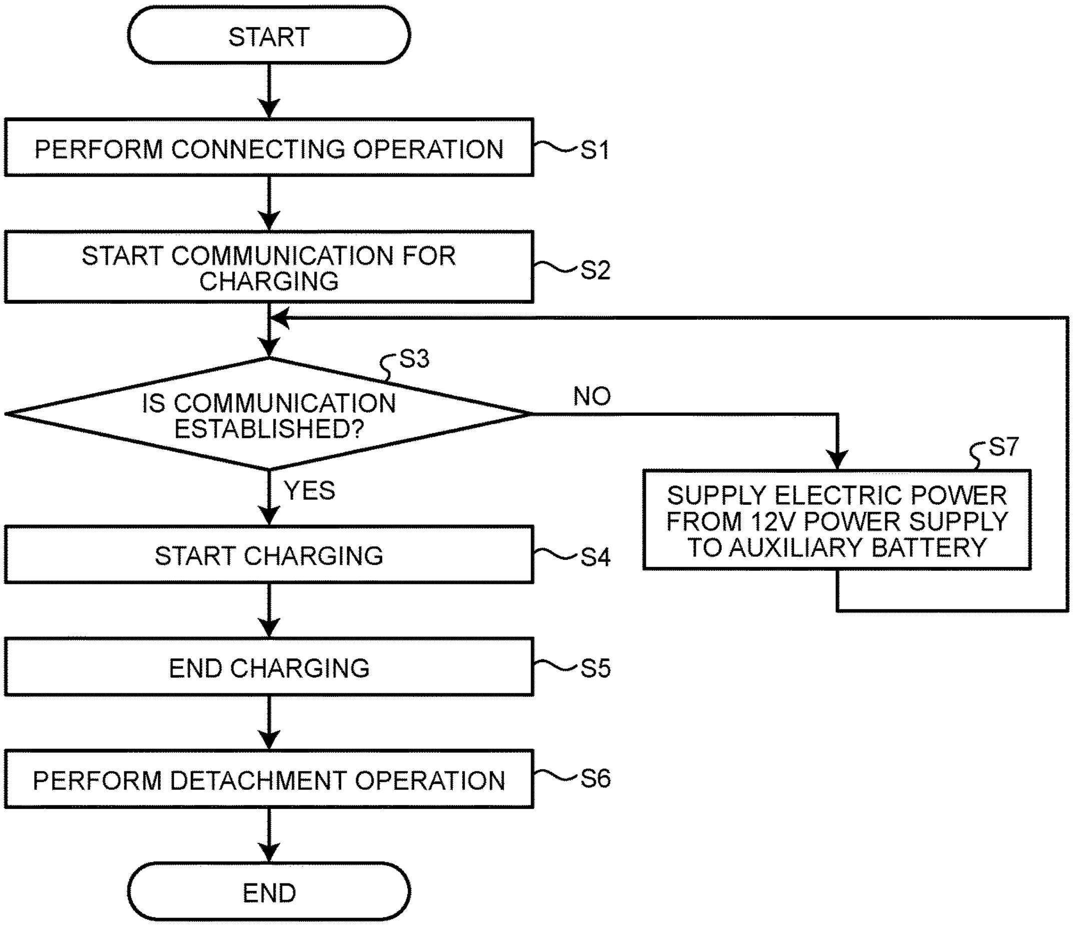
FIG. 2 is a flowchart illustrating an example of control performed by the charging system.

FIG. 2 is a flowchart illustrating an example of control performed by the charging system 100.

First, in the charging system 100, when the charging facility 21 receives a charging start instruction from a user, the arm device 22 drives the charging arm 24 to perform a connecting operation of inserting the connector 25 to the inlet 18 of the vehicle 1 to connect the connector 25 and the inlet 18 (step S1). Next, the control device 211 of the charging facility 21 starts communication with the first ECU 14 of the vehicle 1 for charging (step S2). Next, the control device 211 of the charging facility 21 determines whether or not communication between the control device 211 and the first ECU 14 of the vehicle 1 is established (step S3). When the control device 211 of the charging facility 21 determines that communication between the control device 211 and the first ECU 14 of the vehicle 1 is not established (No in step S3), the 12V power supply 23 of the charging facility 21 supplies electric power to the auxiliary battery 13 of the vehicle 1 (step S7). Thereafter, the process proceeds to step S3, and the control device 211 of the charging facility 21 again determines whether or not the communication between the control device 211 and the first ECU 14 of the vehicle 1 is established, and repeatedly performs the same control until the communication can be established.

When the control device 211 of the charging facility 21 determines that the communication between the control device 211 and the first ECU 14 of the vehicle 1 is established (Yes in step S3), the charging facility 21 supplies electric power to the main battery 11 via the arm device 22 and starts charging to the main battery 11 (step S4). After that, for example, when the main battery 11 is fully charged, the first ECU 14 of the vehicle 1 communicates with the control device 211 of the charging facility 21 to stop supplying electric power from the charging facility 21 to the main battery 11, and ends the charging (step S5). Next, the arm device 22 drives the charging arm 24 to perform a detachment operation of pulling out the connector 25 from the inlet 18 of the vehicle 1 (step S6). Thereafter, the charging system 100 ends the control of the example.

In the charging system 100 according to the first embodiment, even if the electric power of the auxiliary battery 13 of the vehicle 1 is insufficient, the 12V power supply 23 of the charging facility 21 can supply electric power to the auxiliary battery 13 to secure the electric power for activating the first ECU 14, and the charging of the main battery 11 can be started.

Second Embodiment

Hereinafter, a second embodiment of a charging system according to the disclosure will be described below. In the second embodiment, descriptions of contents common to those of the first embodiment will be omitted as appropriate.

Figure 3:
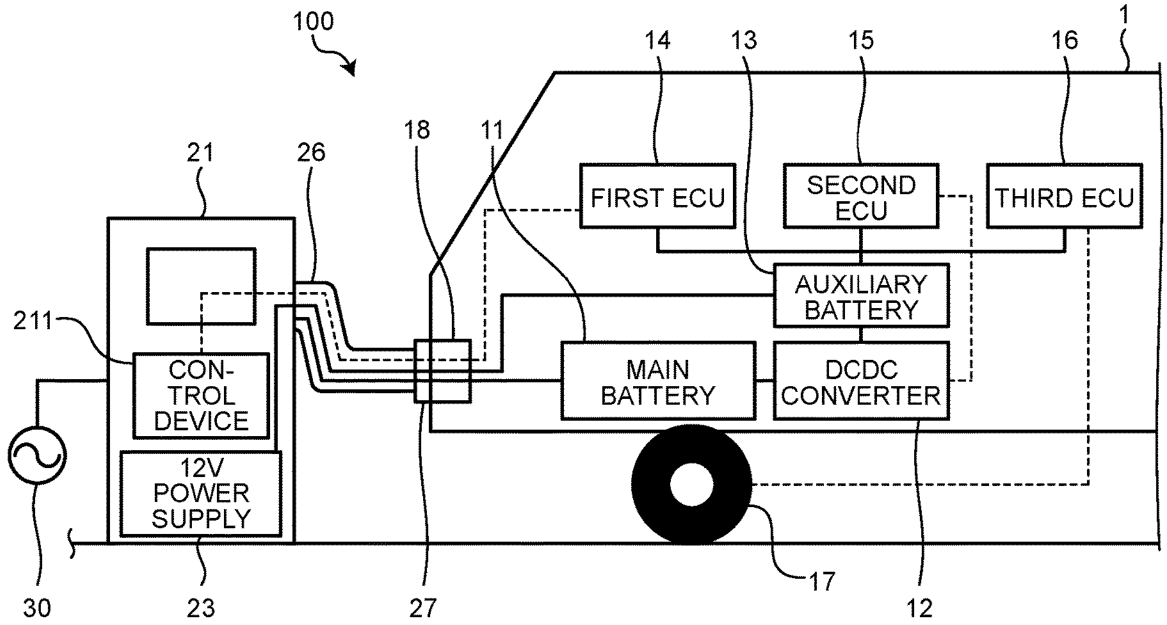
FIG. 3 is a diagram illustrating a schematic configuration of a charging system according to a second embodiment.

FIG. 3 is a diagram illustrating a schematic configuration of a charging system 100 according to a second embodiment. The charging system 100 according to the second embodiment includes the vehicle 1 and the charging facility 21.

The charging facility 21 includes a charging cable 26 including a connector 27 connectable to the inlet 18 of the vehicle 1. In the charging system 100 according to the second embodiment, the user can manually insert and remove the connector 27 into and from the inlet 18 of the vehicle 1 to perform charging.

In the charging system 100 according to the second embodiment, after the user manually inserts the connector 27 into the inlet 18 of the vehicle 1, when the charging facility 21 receives a charging start instruction from the user, communication between the first ECU 14 of the vehicle 1 and the charging facility 21 for charging is started. When the communication between the first ECU 14 of the vehicle 1 and the charging facility 21 is not established, the control device 211 of the charging facility 21 determines that the communication between the first ECU 14 of the vehicle 1 and the charging facility 21 cannot be established due to insufficient power of the auxiliary battery 13, and supplies electric power to the auxiliary battery 13 of the vehicle 1 from a 12V power supply 23 of the charging facility 21. Then, when the auxiliary battery 13 is charged with constant electric power and the communication between the first ECU 14 of the vehicle 1 and the charging facility 21 becomes possible, the control device 211 of the charging facility 21 supplies electric power from the charging facility 21 to the main battery 11 to start charging.

In the charging system 100 according to the second embodiment, even if the electric power of the auxiliary battery 13 of the vehicle 1 is insufficient, the 12V power supply 23 of the charging facility 21 can supply electric power to the auxiliary battery 13 to secure the electric power for activating the first ECU 14, and the charging of the main battery 11 can be started.

Third Embodiment

Hereinafter, a third embodiment of a charging system according to the disclosure will be described below. In the third embodiment, descriptions of contents common to those of the first embodiment will be omitted as appropriate.

Figure 4:
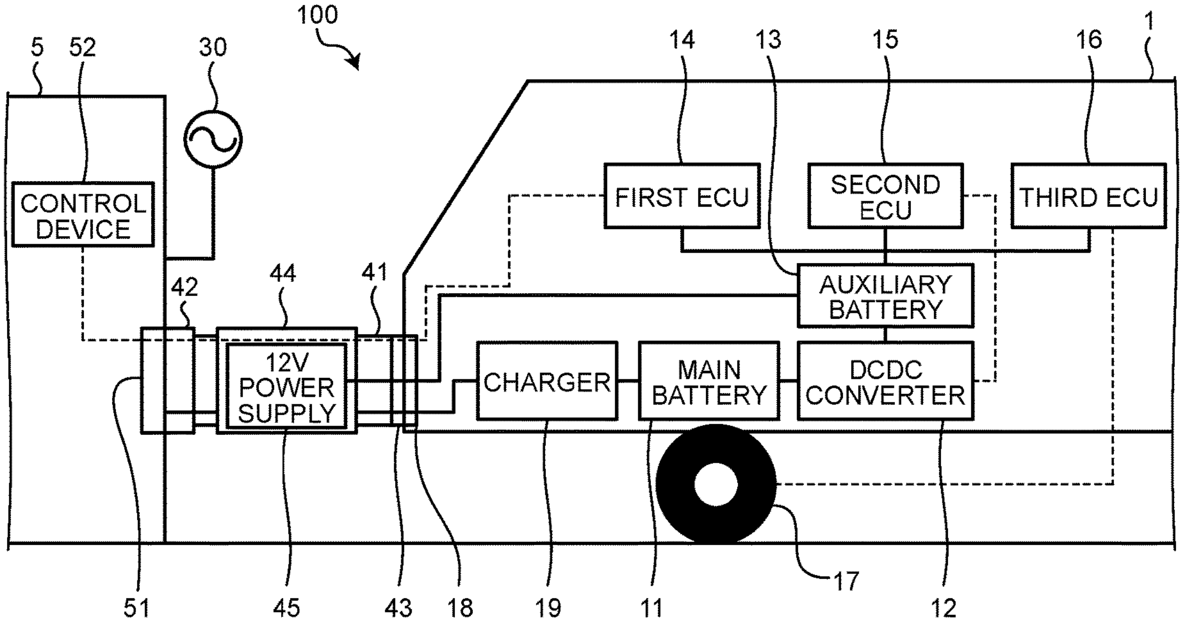
FIG. 4 is a diagram illustrating a schematic configuration of a charging system according to a third embodiment.

FIG. 4 is a diagram illustrating a schematic configuration of a charging system 100 according to a third embodiment. The charging system 100 according to the third embodiment includes the vehicle 1 and a charging facility 5.

The vehicle 1 includes the main battery 11, the DCDC converter 12, the auxiliary battery 13, the first ECU 14, the second ECU 15, the third ECU 16, the drive wheels 17, the inlet 18, and a charger 19. The inlet 18 is electrically connected to the main battery 11 via the charger 19. The inlet 18 is electrically connected to the auxiliary battery 13. The main battery 11 and the auxiliary battery 13 are configured to be chargeable by the charging facility 5 via the inlet 18.

The charging facility 5 is an external power supply facility such as a house connected to the system power supply 30. The charging facility 5 includes an outlet 51, a control device 52, and a charging cable 41. In the charging facility 5, the electric power supplied from the system power supply 30 can be output from the outlet 51. The control device 52 is a charging controller capable of performing charge control by receiving a charge start instruction from a user or by performing a charge communication with the first ECU 14 of the vehicle 1. The charging cable 41 includes a plug 42 connectable to the outlet 51 of the charging facility 5 and a connector 43 connectable to the inlet 18 of the vehicle 1 at both ends of the charging cable 41. The charging cable 41 further includes a control box 44 in the middle of the charging cable 41. The control box 44 has a communication function capable of communicating with the first ECU 14 of the vehicle 1, and a display function for displaying the communication result. The control box 44 receives various types of information such as that the vehicle 1 is being charged, that the charging has been completed, and that an abnormality such as an electric leakage has not occurred, through communication with the first ECU 14 of the vehicle 1, and displays them on a display as appropriate. A 12V power supply 45 and the like are built in the control box 44.

In the charging system 100 according to the third embodiment, first, a user manually connects the connector 43 of the charging cable 41 to the inlet 18 of the vehicle 1 to connect the plug 42 of the charging cable 41 to the outlet 51 of the charging facility 5. Next, the first ECU 14 of the vehicle 1 starts communication between the first ECU 14 and the control device 52 of the charging facility 5 for charging. When the communication between the first ECU 14 of the vehicle 1 and the control device 52 of the charging facility 5 is not established, the control device 52 of the charging facility 5 determines that the communication between the first ECU 14 of the vehicle 1 and the control device 52 of the charging facility 5 cannot be established due to insufficient power of the auxiliary battery 13, and supplies electric power to the auxiliary battery 13 of the vehicle 1 from the 12V power supply 45 of the control box 44. Then, when the auxiliary battery 13 is charged with a certain amount of electric power and the communication between the first ECU 14 of the vehicle 1 and the control device 52 of the charging facility 5 becomes possible, the control device 52 of the charging facility 5 supplies electric power from the outlet 51 of the charging facility 5 to the main battery 11 via the charger 19 to start charging.

In the charging system 100 according to the third embodiment, even if the power of the auxiliary battery 13 of the vehicle 1 is insufficient, the 12V power supply 45 can supply electric power to the auxiliary battery 13 to secure the electric power for activating the first ECU 14, and the charging of the main battery 11 can be started.

In the charging system according to the present disclosure, when the electric power of the auxiliary battery of the vehicle is insufficient, the auxiliary battery is charged from the 12V power supply of the charging facility, whereby the electric power to be supplied to the vehicle controller of the vehicle can be secured. Thus, the charging control device of the charging device can start the charging of the battery for traveling of the vehicle by communicating with the vehicle controller.

Further, in the charging system according to the present disclosure, the arm device automatically inserts and removes the connector into and from the inlet, and the automatic charging for charging the battery for traveling of the vehicle can be performed.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A charging system comprising:

a vehicle including an inlet, a vehicle controller, a battery, and an auxiliary battery for supplying power to the vehicle controller; and a charging device including a connector configured to be connected to the inlet of the vehicle, a charging controller, and a power source, the charging device being configured to charge the battery when the connector of the charging device is connected to the inlet of the vehicle and the vehicle controller of the vehicle is communicated with the charging controller of the charging device, the auxiliary battery of the vehicle and the power source of the charging device being configured to be electrically connected to each other when the inlet of the vehicle and the connector of the charging device is connected to each other, the charging controller of the charging device being configured to supply power from the power source to the auxiliary battery to charge the auxiliary battery when communication between the vehicle controller and the charging controller is not established.

2. The charging system according to claim 1, wherein the charging device further includes an arm configured to automatically perform insertion and removal of the connector of the charging device with respect to the inlet of the vehicle.

* * * * *